United States Patent [19]

Theodore et al.

[11] Patent Number: 5,338,932
[45] Date of Patent: Aug. 16, 1994

[54] METHOD AND APPARATUS FOR MEASURING THE TOPOGRAPHY OF A SEMICONDUCTOR DEVICE

[75] Inventors: N. David Theodore, Mesa; Juan P. Carrejo, Tempe, both of Ariz.

[73] Assignee: Motorola, Inc., Schaumburg, Ill.

[21] Appl. No.: 168

[22] Filed: Jan. 4, 1993

[51] Int. Cl.⁵ ............................................. H01J 37/00
[52] U.S. Cl. ................................... 250/306; 250/307
[58] Field of Search ................................ 250/306, 307

[56] References Cited

U.S. PATENT DOCUMENTS

| | | | |
|---|---|---|---|
| 4,724,318 | 2/1988 | Binnig | 250/306 |
| 4,912,822 | 4/1990 | Zdeblick et al. | |
| 5,017,266 | 5/1991 | Zdeblick et al. | |
| 5,025,658 | 6/1991 | Elings et al. | 250/306 |
| 5,051,379 | 9/1991 | Bayer et al. | 250/306 |
| 5,144,128 | 9/1992 | Hasegawa et al. | 250/307 |
| 5,162,653 | 11/1992 | Hosaka et al. | 250/307 |
| 5,166,520 | 11/1992 | Prater et al. | 250/306 |
| 5,189,906 | 3/1993 | Elings et al. | 250/306 |
| 5,229,606 | 7/1993 | Elings et al. | 250/306 |
| 5,253,515 | 10/1993 | Toda et al. | 250/306 |
| 5,268,571 | 12/1993 | Yamamoto et al. | 250/306 |

OTHER PUBLICATIONS

R. Kliese et al. "Real-Time STM Investigation of the Initial Stages of Oxygen Interaction With Si(100)2X1", Ultramicrosscopy, vol. 42–44, pp. 824–831, 1992.

H. Haefke et al "Atomic Surface and Lattice Structures of AgBr Thin Films", Ultramicroscopy, vol. 42–44, pp. 290–297, 1992.

*Primary Examiner*—Bruce C. Anderson
*Attorney, Agent, or Firm*—Robert F. Hightower; Joe E. Barbee

[57] ABSTRACT

The topography of a surface is measured by utilizing a probe (10, 20) having a variable flexibility and a conductive tip (14, 16). Using the conductive tip (14, 16), a first tunneling current is measured at a first point (36). The tip (14, 16) is moved to a second point (37) and a deflection force is measured. The measurements from the different points (36, 37, 38, 39, 40, 41) are combined to provide composite images of the surface's topography and material composition.

25 Claims, 2 Drawing Sheets

METHOD AND APPARATUS FOR MEASURING THE TOPOGRAPHY OF A SEMICONDUCTOR DEVICE

BACKGROUND OF THE INVENTION

The present invention relates, in general, to measuring the topography of surfaces, and more particularly, to measuring the topography of a surface by using a combination of atomic force microscopy and scanning tunneling microscopy.

In the past, a variety of techniques have been utilized to determine the topography of a surface, such as the surface of a semiconductor device. Scanning tunneling microscopy and atomic force microscopy represent two imaging techniques used for such purposes. Scanning tunneling microscopy (STM) is a technique of determining a surface's topography by plotting the value of tunneling current that flows between various points on the surface and an STM probe positioned near the surface. The tunneling current's value is inversely proportional to the work function of the material underlying the probe, the higher the work function the lower the tunneling current. Consequently, STM typically is not suitable for surfaces having a variety of materials because the different work functions of the different materials affect the tunneling current thereby causing inaccurate measurements. Additionally, STM cannot be used for insulating surfaces such as silicon dioxide. Since semiconductor devices typically include a layer of silicon dioxide covering a variety of other materials, STM generally cannot be used to accurately determine the topography of a semiconductor device's surface.

Atomic force microscopy (AFM) is a technique commonly utilized to determine the surface topography of materials, including insulating materials. Although AFM is suitable for measuring the topography of conductors and insulators, AFM cannot determine whether a material is a conductor or an insulator. Consequently, AFM cannot accurately delineate between different materials on the surface.

Accordingly, it is desirable to have a method of using a combination of AFM and STM to provide an accurate representation of a surface's topography and material composition, and a method that performs both AFM and STM measurements using the same probe.

SUMMARY OF THE INVENTION

The topography of a surface is measured by utilizing a probe having a variable flexibility that facilitates performing AFM measurements of a surface. The probe also has a conductive tip that facilitates performing STM measurements of the surface. Using the conductive tip, a first tunneling current is measured at a first point. The tip is moved to a second point and the probe is used for measuring a deflection force.

An variable flexibility probe for performing the measurements is also included.

DETAILED DESCRIPTION OF THE DRAWINGS

Figure 1:
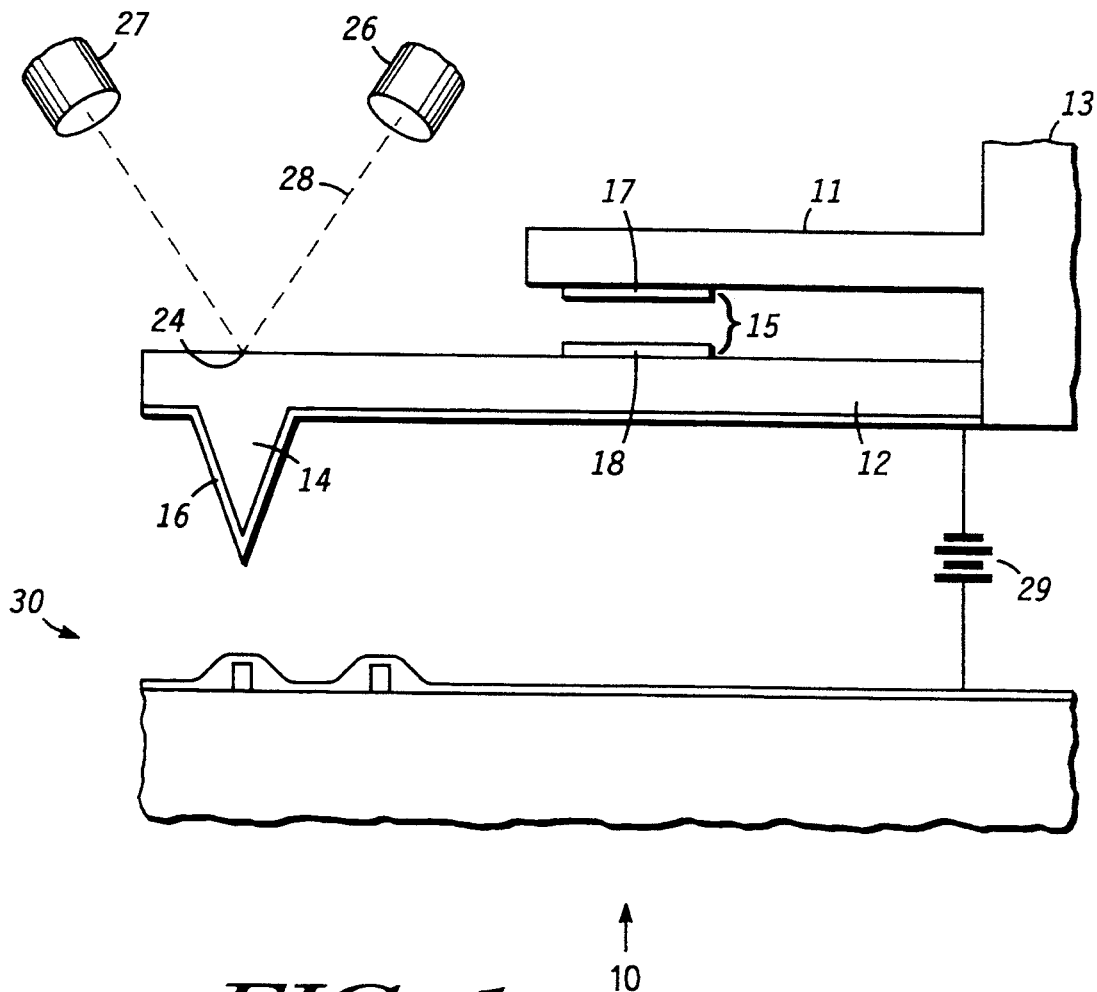
FIG. 1 illustrates an enlarged cross-section of a variable flexibility probe in accordance with the present invention.

FIG. 1 illustrates an enlarged cross-section of an embodiment of a variable flexibility probe 10. Probe 10 is suitable for measuring the topography of a surface using both atomic force microscopy (AFM) and scanning tunneling microscopy (STM) techniques. Probe 10 includes a reference element 11 and a variable stiffness element 12. A first end of element 11 and a first end of element 12 are attached to a support member 13 so that elements 11 and 12 form two parallel cantilever arms that project from member 13. A force means or force element 15 is attached to both element 11 and element 12. As will be seen hereinafter, element 15 applies a variable force to element 12 in order to vary the stiffness or spring-constant of element 12. To facilitate applying the variable force to element 12, it is desirable for element 11 to be rigid relative to element 12. The rigidity is provided by the attachment to member 13, and by forming element 11 from a material that is less flexible than element 12. In the preferred embodiment, element 11 is formed from tungsten to provide the desired rigidity, however, materials such as polysilicon, tungsten silicide, or steel can also be used.

At a second end of element 12, distal from member 13, a sharp tip 14 projects perpendicularly from a first or bottom surface of element 12. A conductor 16 covers tip 14 in order to provide the conduction characteristic required for STM measurements. Conductor 16 continues along the bottom surface of element 12 in order to connect conductor 16 to the external electrical circuitry (not shown) of an STM microscope. Such electrical circuitry is used for measuring tunneling current that flows during STM measurements. Element 12 can be formed from a of variety of materials and configurations as long as element 12 is self-supporting and the flexibility of element 12 can be varied by force element 15. Suitable materials for element 12 include semiconductor materials such as silicon and silicon nitride. However, forming element 12 from conducting materials such as copper, aluminium, or doped silicon eliminates the need for conductor 16. In the preferred embodiment, element 12 is a rectangular silicon nitride bar having a length between 100 and 200 microns, and a thickness of between approximately 0.6 and 2.0 microns. Also in this preferred embodiment, tip 14 projects approximately 15 microns from the first surface of element 12, and is covered with a tungsten conductor 16.

The preferred embodiment of force element 15 is a capacitor that includes a first conductor 18 attached to a second or top surface of element 12 and a second conductor 17 attached to a first or bottom surface of element 11. Conductors 17 and 18 form two parallel plates of the capacitor, and are separated by less than about two microns. A force voltage is applied to conductors 17 and 18 by an adjustable voltage source (not shown) which is connected to conductors 17 and 18. As the force voltage is increased, conductors 17 and 18 repel thereby applying a force to element 12 and varying the stiffness or spring-constant of element 12. The amount of force depends on the force voltage, the capacitance of element 15, and the distance between conductors 17 and 18 as shown by the equation:

$$F = -V^2 \frac{\partial C}{\partial D}$$

where:
- F = force applied to element 12,
- V = force voltage applied to element 15,
- ∂C = partial derivative of the capacitance of element 15, and
- ∂D = partial derivative of the distance between conductors 17 and 18.

The variable stiffness characteristic of element 12 facilitates performing AFM measurements on surfaces, such as the surface of a semiconductor device 30. As tip 14 passes over elevations and depressions on the surface of device 30, atomic force interactions between tip 14 and the surface apply forces that repel tip 14 from the surface. The repulsive force causes a small vertical deflection in the position of tip 14. The amount of deflection depends on the distance between tip 14 and the surface and the rigidity of element 12. Typically the deflection is about 0.2 to 0.5 microns. These deflections are measured by reflecting light, illustrated by a dashed line 28, from a laser or other light source 26 off the top surface of element 12. The reflected light is detected with a detector 27. The deflections of element 12 vary the position of reflected light on detector 27, and detector 27 converts the light position variations into a voltage variation. In the preferred embodiment detection 27 is a multiple element photodiode. In order to facilitate reflecting light from element 12, element 11 generally is shorter than element 12. In the preferred embodiment, element 11 is between five and fifteen microns shorter than element 12.

For STM measurements, a tunneling voltage 29 provides a potential that induces tunneling current to flow between tip 14 and the surface of device 30. Voltage 29 typically is an adjustable voltage source having a first terminal connected to conductor 16 and a second terminal connected to the surface of device 30.

Figure 2:
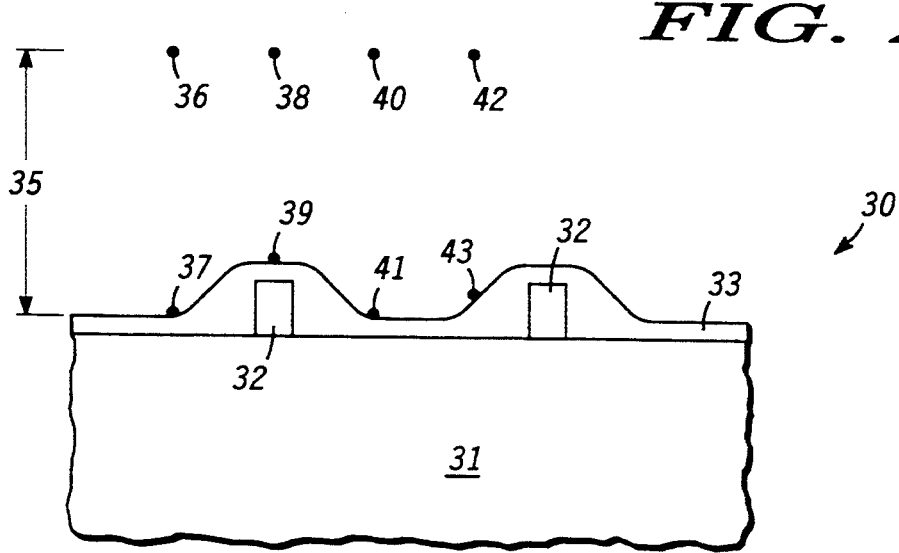
FIG. 2 illustrates a method of obtaining AFM and STM images of a surface in accordance with the present invention.

FIG. 2 is a schematic that assists in explaining a method of performing both STM and AFM measurements utilizing probe 10 of FIG. 1. Elements of FIG. 2 that are the same as FIG. 1 have the same reference numerals. In order to facilitate the description of FIG. 2, the description contains various references to the elements of FIG. 1. Semiconductor device 30 has a surface that is illustrative of one type of surface that can be imaged with probe 10 of FIG. 1. Device 30 includes a semiconductor substrate 31 having irregular features and a variety of materials such as conductors 32, and a silicon dioxide layer 33.

To measure the topography of device 30, tip 14 is employed to conduct both STM and AFM measurements at a variety of points along the surface. For each point to be measured on the surface, a pair of STM and AFM measurements are made. The STM measurement includes applying a first force voltage for setting the flexibility of element 12 to a first stiffness, and positioning tip 14 at a first point 36 a first distance 35 above the surface of device 30. At point 36 tunneling voltage 29 (see FIG. 1) is applied between device 30 and tip 14 to cause a first tunneling current to flow. The first tunneling current is measured to produce a first tunneling current value. The amount of tunneling current varies depending upon the value of voltage 29, and the distance between tip 14 and the surface of device 30. For example, at a distance of approximately 0.5 to 1.0 nanometers, a voltage of approximately one volt results in a tunneling current of approximately one nanoampere from a silicon surface. Tip 14 is then positioned at a second point 38 that is in a plane that includes point 36 and is substantially parallel to device 30. At point 38 a second tunneling current value is measured. Tip 14 is then moved back to point 36 and the first tunneling current is once again measured to ensure that tip 14 is properly positioned. If the first tunneling current is not verified at point 36, the position of tip 14 is slightly varied until the first tunneling current is obtained. Since the tunneling current value is affected by both the height of the surface and the work function of the material on the surface, the STM measurements alone cannot provide information about either topographical or material characteristics of the surface. As will be seen hereinafter, AFM data can be used to separate the STM information into separate topographical and material characteristics since AFM measurements contain only topographical characteristics.

Subsequently, AFM measurements are taken by removing voltage 29, and adjusting the stiffness of element 12 to a second stiffness that is less than the first stiffness. Then tip 14 is lowered perpendicularly from point 36 toward the surface until contacting the surface at a third point 37. During the movement, atomic forces will at first attract tip 14. But as tip 14 is moved closer to the surface, the atomic forces will begin repelling tip 14. The second stiffness is sufficient to permit element 12 to deflect in response to these repulsive forces. The first stiffness should be infinite but typically is as large as can possibly be obtained. In the preferred embodiment, the first stiffness is approximately one thousand to ten thousand newtons/meter while the second stiffness is approximately one to one hundred newtons/meter. The deflection of element 12 is measured to determine the position of tip 14 during the movement.

After positioning tip 14 at point 37, a first deflection of element 12 is measured to represent the repulsive force between the surface and tip 14. Then, tip 14 is moved along the surface to a fourth point 39. Point 39 is in a line that is perpendicular to the surface and includes point 38. At point 39, a second repulsive force or deflection is measured. Tip 14 is then moved along the surface to a fifth point 41 where a third repulsive force is measured. Subsequently, the flexibility of element 12 is set to the first stiffness, and tip 14 is moved to point 38 by moving tip 14 from point 41 to point 39, and then perpendicularly away from the surface of device 30 to point 38. The second tunneling current is measured to verify that tip 14 is once again at point 38.

The sequence of STM and AFM measurements is repeated until sufficient measurements are taken to determine the topography of device 30. Subsequent measurement sequences include moving tip 14 to a sixth point 40 that is in the plane with points 36 and 38, and also is aligned with point 41 in a perpendicular line from the surface of device 30. A third tunneling current is measured at point 40, then tip 14 is moved to a seventh point 42 where a fourth tunneling current is measured. Thereafter tip 14 is moved back to point 40 to verify the third tunneling current, and tip 14 is moved to point 41 to verify the third repulsive force before moving to point 43, until sufficient measurements are taken to determine the topography of the surface.

After the STM and AFM measurements are complete, images representing the topography of the surface and the materials on the surface can be displayed. The sequence used to obtain the STM and AFM measurements ensures that each pair of STM and AFM measurements is made directly above the same point on the surface, thereby ensuring that the STM and AFM measurements can be used to produce an accurate representation of the surface topography and material composition. The AFM topography measurements can be subtracted from the STM measurements thereby leaving STM work-function measurements. Such work-function measurements represent the type of material on the surface. The work function measurements facilitate displaying images showing the shape and location of different materials on the surface. For example, the STM work-function measurements can be displayed as a grey-scale image wherein high work functions materials (e.g., insulators) are dark and low work-function materials (e.g., conductors) are light.

An alternate method of utilizing variable flexibility probe 10 includes using the first stiffness while moving tip 14 from point 36 toward point 37. Once tip 14 is in the region of repulsive forces, the stiffness is changed to the second stiffness. This sequence prevents any sudden deflections as element 12 moves from the attractive force region to the repulsive force region thereby ensuring that tip 14 is not forced into contact with the surface.

Figure 3:
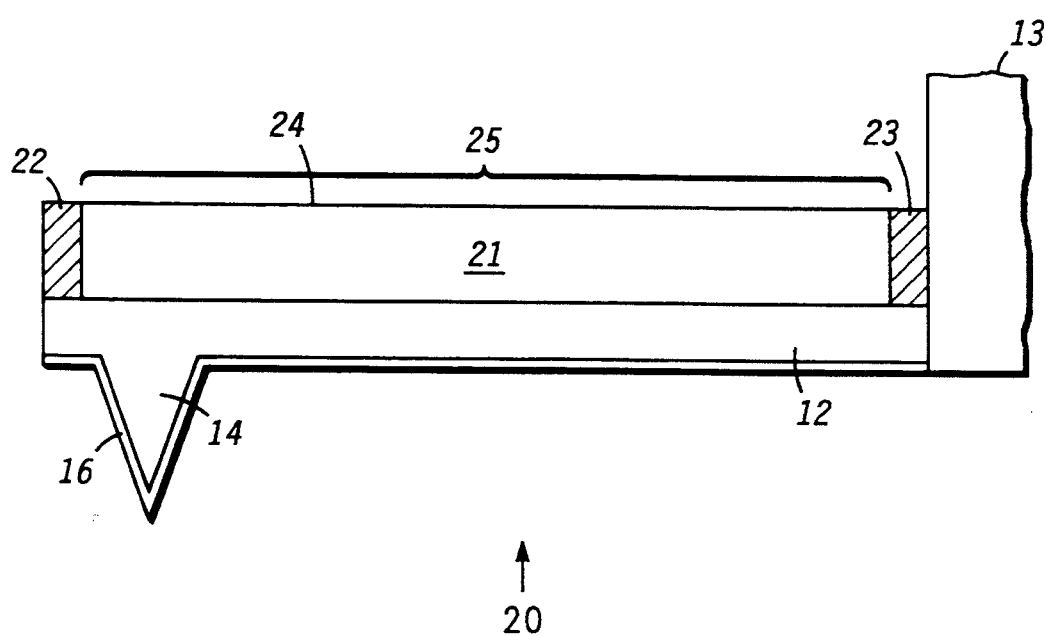
FIG. 3 illustrates an alternate embodiment of a variable flexibility probe in accordance with the present invention.

FIG. 3 illustrates a variable flexibility probe 20 that is an alternate embodiment of variable flexibility probe 10 of FIG. 1. Elements of FIG. 3 that are the same as FIG. 1 have the same reference numerals. Probe 20 includes a variable force element 25 that is attached to the second surface of element 12. Element 25 includes a piezoelectric actuator 21 that is used to apply force to element 12. The force voltage is applied to element 21 by a pair of electrodes 22 and 23 that are attached to actuator 21 and electrically connected to the variable voltage source (not shown). As the force voltage is increased, element 21 expands thereby applying a downward force on element 12.

The STM and AFM measurements can also be made in different sequences, however, it is believed that the sequence described in the description of FIG. 2 provides the most accurate topographic measurements. For example, all STM measurements could be performed before the AFM measures are performed, or some portion of the STM measurements could be performed prior to some portion of the AFM measurements. A variable flexibility probe such as probe 10 or probe 20 facilitates such combined STM and AFM measurements.

Probe 10 (FIG. 1) and probe 20 (FIG. 3) can also be used to change the stiffness to match the hardness of the material on the surface. The stiffness can be set to prevent damage to the surface and yet provide a stiffness that prevents unstable vibrations and oscillations of the probe. For example, a high stiffness can be used to scan a hard material such as tungsten or tungsten silicide, while a low stiffness can be used to scan soft materials such as silicon dioxide or organic materials.

By now it should be appreciated that there has been provided a novel way to determine the topography and material composition of a surface. The variable flexibility probe facilitates obtaining both STM and AFM measurements. Utilizing a single variable flexibility probe facilitates performing an AFM and STM measurement pair that coincides to the same point on the surface thereby facilitating accurate surface measurements. The AFM measurements can be used to illustrate the topography of the surface and the STM and AFM measurements can be combined to illustrate the type and shape of materials on the surface.

We claim:

1. A method of measuring the topography of a semiconductor device comprising:
   providing a semiconductor device having a surface;
   providing a variable flexibility probe having a tip projecting perpendicularly from a first surface of the variable flexibility probe wherein the variable flexibility probe is electrically coupled to a scanning tunneling microscope;
   establishing a first stiffness of the variable flexibility probe;
   placing the tip at a first point that is a first distance above the surface;
   applying a tunneling voltage between the tip and the surface;
   measuring a first tunneling current;
   moving the tip to a second point that is in a plane wherein the plane includes the first point and is substantially parallel to the semiconductor device;
   measuring a second tunneling current;
   returning the tip to the first point;
   removing the tunneling voltage;
   establishing a second stiffness of the variable flexibility probe wherein the second stiffness is less than the first stiffness;
   moving the tip perpendicularly toward the surface to a third point on the surface;
   measuring a first repulsive force;
   moving the tip to a fourth point on the surface wherein the fourth point is displaced perpendicularly toward the surface from the second point;
   measuring a second repulsive force;
   moving the tip to a fifth point on the surface; and
   measuring a third repulsive force.

2. The method of claim 1 further including displaying an image representing the type of material on the surface by combining values of the first tunneling current with the first repulsive force, and the second tunneling current with the second repulsive force.

3. The method of claim 1 wherein providing the variable flexibility probe includes providing a silicon nitride bar having the tip projecting perpendicularly from first surface of the silicon nitride bar, and a piezoelectric element attached to a second surface of the silicon nitride bar and wherein a conductor covers the tip.

4. The method of claim 3 wherein establishing the first stiffness of the variable flexibility probe includes applying a force voltage to the piezoelectric element thereby applying a force to the second surface of the silicon nitride bar.

5. The method of claim 1 wherein measuring the first repulsive force includes detecting light reflected from the variable flexibility probe and converting a position of the reflected light to a voltage.

6. The method of claim 1 further including returning the tip to the fourth point;
   returning the tip to the second point by moving the tip perpendicularly away from the surface;
   applying the tunneling voltage between the tip and the surface;
   moving the tip in the plane to a sixth point that is displaced from the fifth point along a line perpendicular to the surface; and
   measuring a third tunneling current.

7. A method of determining the topography of a surface comprising:

providing a surface;

providing a variable flexibility probe having a conductive tip wherein the variable flexibility probe includes a force element for varying a stiffness of the variable flexibility probe;

positioning the conductive tip at a first point above the surface;

measuring a first tunneling current;

moving the conductive tip to a second point on the surface; and measuring a first deflection.

8. The method of claim 7 further including displaying an illustration of the surface by using values of the first tunneling current, and the first deflection.

9. The method of claim 7 wherein measuring the first tunneling current includes applying a tunneling voltage between the tip and the surface, and measuring the current flowing between the surface and the tip.

10. The method of claim 7 wherein moving the conductive tip to the second point includes setting a stiffness of the variable flexibility probe, and moving the tip from the first point perpendicularly toward the surface.

11. The method of claim 10 wherein setting the stiffness of the variable flexibility probe includes applying a voltage to a capacitor force element of the variable flexibility probe.

12. The method of claim 7 wherein moving the conductive tip to the second point includes moving the conductive tip from the first point to a third point by moving the conductive tip in a plane substantially parallel to the surface, measuring a second tunneling current, and moving the conductive tip back to the first point prior to moving the conductive tip to the second point.

13. The method of claim 7 further including moving the conductive tip to a third point on the surface, measuring a second deflection, moving the tip to a fourth point on the surface, measuring a third deflection, returning the tip to the third point, setting a stiffness of the variable flexibility probe, and moving the tip perpendicularly away from the surface.

14. The method of claim 7 wherein measuring the first deflection includes detecting reflected light from the variable force probe and converting a position of the reflected light to a voltage value.

15. The method of claim 7 wherein providing the variable flexibility probe includes providing a silicon nitride bar having the tip projecting perpendicularly from a first surface of the silicon nitride bar, and a piezoelectric element attached to an opposite surface of the silicon nitride bar wherein a conductor covers the tip.

16. A variable flexibility probe for use in measuring the topography of a semiconductor device comprising:

a silicon nitride bar having a first end attached to a support member wherein the silicon nitride bar is cantilevered from the support member, the silicon nitride bar having a tip projecting from a first surface;

a reference element having a first end attached to the support member wherein the reference element is cantilevered from the support member and is in a plane parallel to the silicon nitride bar; and a capacitor force element having a first plate of the capacitor attached to a second surface of the silicon nitride bar and a second plate of the capacitor attached to a first surface of the reference element.

17. The variable flexibility probe of claim 16 wherein the silicon nitride bar has a length between 100 and 200 microns, and a thickness between 0.6 and 2 microns.

18. The variable flexibility probe of claim 16 wherein the first plate of the capacitor is displaced from the second plate of the capacitor by less than approximately two microns.

19. The variable flexibility probe of claim 16 further including a conductor covering the tip.

20. A variable flexibility probe for use in making scanning tunneling microscopy and atomic force microscopy measurements of a surface comprising:

a variable stiffness element having a first end attached to a support member wherein the variable stiffness element is cantilevered from the support member;

a conductive tip projecting perpendicularly from a first surface of the variable stiffness element wherein the conductive tip is used for making the scanning tunneling microscopy measurement of the surface; and a force means for applying a varying force to the variable stiffness element for the purpose of changing a stiffness of the variable stiffness element for making the atomic force microscopy measurements.

21. The variable flexibility probe of claim 20 wherein the force means includes a piezoelectric actuator attached to a surface of the variable stiffness element.

22. The variable flexibility probe of claim 20 wherein the variable stiffness element is formed from a conductor.

23. The variable flexibility probe of claim 20 wherein the the variable stiffness element is a material from the group including silicon nitride, aluminum, copper, and doped silicon.

24. The variable flexibility probe of claim 20 wherein the variable stiffness element is a rectangular bar having a length between 100 and 200 microns, a thickness between 0.6 and 2.0 microns, and wherein the tip projects approximately 15 microns from the first surface of the variable stiffness element.

25. The variable flexibility probe of claim 20 wherein the force means for applying the varying force to the variable stiffness element includes the force means having a capability of varying the stiffness of the variable stiffness element between approximately one newton/meter and ten thousand newtons/meter.

* * * * *